United States Patent
Pieschel et al.

(10) Patent No.: US 6,579,977 B1
(45) Date of Patent: Jun. 17, 2003

(54) BIOSORBENTS AND PROCESS FOR PRODUCING THE SAME

(75) Inventors: Friedemann Pieschel, Wolfen (DE); Ekkehard Lange, Dessau (DE); Juan Camacho, Wolfen (DE); Christine Fieseler, Zörbig (DE); Hendrik Ikier, Wolfen (DE)

(73) Assignee: EISU Innovative Gesellschaft fur Technik und Umweltschutz mbH, Wolfen (DE)

( * ) Notice: Subject to any disclaimer, the term of this patent is extended or adjusted under 35 U.S.C. 154(b) by 0 days.

(21) Appl. No.: 09/555,540

(22) PCT Filed: Nov. 27, 1998

(86) PCT No.: PCT/DE98/03504

§ 371 (c)(1), (2), (4) Date: May 31, 2000

(87) PCT Pub. No.: WO99/28372

PCT Pub. Date: Jun. 10, 1999

(30) Foreign Application Priority Data

Dec. 1, 1997 (DE) .......................... 197 53 196
Oct. 30, 1998 (DE) .......................... 198 50 286

(51) Int. Cl.$^7$ .......................... C07H 13/12; C07H 1/02; C07H 1/00; C08B 3/00
(52) U.S. Cl. .......................... 536/30; 536/33; 536/34; 536/59; 536/62; 536/124; 536/127; 514/57
(58) Field of Search .......................... 514/57; 536/124, 536/59, 62, 33, 30, 34, 127

(56) References Cited

U.S. PATENT DOCUMENTS 2,964,416 A   12/1960   Glab
3,658,790 A * 4/1972    Bernardin

FOREIGN PATENT DOCUMENTS

| DE | 2 357 696 | 6/1974 |
|----|-----------|--------|
| DE | 42 39 749 | 6/1994 |
| RU | 2096082 | 11/1997 |
| WO | WO 9410091 A1 * | 5/1994 |
| WO | 95/02452 | 1/1995 |

* cited by examiner

Primary Examiner—James O. Wilson
Assistant Examiner—Everett White
(74) Attorney, Agent, or Firm—Collard & Roe, P.C.

(57) ABSTRACT

A process is disclosed for producing biosorbents by phosphorylation of cellulose-containing materials with phosphoric acid or ammonium phosphate in the presence of urea. Also disclosed are biosorbents with particular good use properties. Biosorbents of this type are used, in particular, for removing heavy metals from aqueous solutions. Proceeding from the disadvantages of the known prior art, purification costs of resultant raw products should be lowered and the formation of unwanted soluble organic polymer phosphates as by-products should be prevented. The biosorbents should have an improved mechanical strength and very good use properties. The disclosed biosorbents contain 5–10 % phosphorus and 1–4 % nitrogen in the form of carbamide groups. The synthesis mixture is mixed with elementary sulphur before starting the reaction in order to produce biosorbents with an increased mechanical strength. The proposed procedure allows reducing the otherwise customary reaction temperatures by about 40° C.

20 Claims, No Drawings

BIOSORBENTS AND PROCESS FOR PRODUCING THE SAME

BACKGROUND OF THE INVENTION

1. Field of the Invention

This application is a 371 of PCT/DE98/03504, filed Nov. 27, 1998.

The invention relates to a process for producing biosorbents by phosphorylation of cellulose-containing materials with phosphoric acid or ammonium phosphate in the presence of urea. The invention further relates to biosorbents with particularly good application properties. Biosorbents of this type are employed in particular for removing heavy metals from aqueous solutions.

2. The Prior Art

DE 42 39 749 C2 discloses a process for producing phosphorylated wood. Powdered wood with a particle size of from 0.05 to 3 mm is stirred with phosphoric acid, water and urea to form a paste and partially dried at about 80° C. for about 1 hour. The reaction mixture obtained in this way is heated at about 170° C. for about 70 min, then washed with hot water until the washing liquid appears colorless, and dried. In an alternative embodiment of the process, the use of ammonium phosphate in place of phosphoric acid is also described. It is necessary subsequently to remove phosphate residues and colored impurities from the resulting reaction product or crude product. The purification stages are very time-consuming and have disadvantageous effects on the costs of the final product. According to the purification process described in DE 42 39 749, the crude product must be washed with hot water until the washing liquid appears colorless. The product then obtained is washed with sodium hydroxide solution and finally again washed until the filtrate is colorless, and dried. A further disadvantage of this process is the very large expenditure on phosphoric acid or phosphate and urea. The reaction at 170° C. within the stated duration is very energy-consuming and leads to the formation of intensely dark-colored impurities and decomposition products of wood constituents, which must subsequently be washed out again. In addition, the high phosphorus content in the sorbent, which is desired to achieve a satisfactory sorption capacity, makes it necessary to use a large excess of phosphoric acid or phosphate and urea. Heavy pollution of the washing water during the purification of the crude product is therefore to be expected, resulting in high disposal costs.

DE-A 23 57 696 describes a process in which inter alia cellulose-containing material is mixed with phosphoric acid in the ratio by weight of phosphoric acid to organic material of from 0.25:1 to 2.0:1, and the mixture is roasted at temperatures of from 160 to 600° C. and subsequently washed with water and dried to give a powder.

The disadvantage of this process is, in particular, a low yield of adsorbent. In addition, only inadequate sorption results are achieved with this adsorbent. As is known, cellulose is relatively quickly degraded by strong acids. Addition of phosphoric acid on its own leads to unwanted side reactions which are the cause of the aforementioned disadvantages. WO 95/02452 discloses a process for producing sorbents from polysaccharide-containing raw materials in which modifying agents or mixtures of these agents are added to the latter, and a thermal treatment is carried out at temperatures of up to 600° C. According to the examples, a mixture of orthophosphoric acid, dimethylformamide and urea can serve as modifying agent. The mixture is boiled with the cellulose-containing material at 150° C. for two hours. The mixture is then filtered, the solid residue is washed with distilled water until the liquid phase is neutral, and the residue is dried and comminuted.

However, carrying out the phosphorylation in dimethylformamide proves to be a disadvantage because of the complexity of the removal and recycling of this solvent, which is known not to be without problems. In addition, this process requires the use of relatively large amounts of urea. The sorbents produced in this way and based on cellulose-containing raw materials such as sugar beet pulp and fungal mycelia have unfavorable mechanical properties which preclude use in the adsorber columns which are known to be very efficient. In addition, the products show sorption performances which do not exceed those of phosphorylated celluloses in either capacity or durability. RU-2096082 C1 moreover discloses that the phosphorylated crude product must be subjected to an elaborate purification. Despite the elaborate purification operations in the known processes, the resulting biosorbents are not free of soluble phosphorus-containing impurities. These are organic polymeric phosphates which cannot be removed completely by washing processes. These by-products can be detected in the final product only with difficulty. They can be flocculated out of their solution for example by making strongly acidic, and give the known phosphate reaction with ammonium molybdate and nitric acid only after boiling for a lengthy period. Because of their structure, these by-products are good complexing agents and moreover impair sorption of heavy metals to the biosorbent. A further disadvantage of the known generic biosorbents is their low mechanical stability. At high flow rates there may be compaction of the sorbent packing, which may lead to complete blockage of the exchange or purification process.

Owing to the low mechanical stability of the biosorbents, they become sponge-like after the purification, and the surface of the particles is covered with fine fibers which, when the biosorbents are used as intended in exchanger columns, are abraded off and washed away even with low mechanical stress. This results in the solutions to be purified becoming cloudy and, moreover, constituents to be adsorbed are discharged with the fiber components which are also washed away. This is a considerable qualitative deficiency of the known biosorbents.

SUMMARY OF THE INVENTION

The invention was based on the object of improving the known processes for producing biosorbents based on cellulose-containing materials by phosphorylation with phosphoric acid or ammonium phosphate in the presence of urea so that the expense of purifying the resulting crude products can be considerably reduced, the formation of unwanted soluble organic polymeric phosphates as by-products is prevented, and biosorbents with increased mechanical strength are obtained.

It is further intended to obtain biosorbents which are distinguished by very good application properties, in particular are suitable for use in adsorber columns and require little expense to produce.

The object is achieved according to the process of the present invention. In addition biosorbents with particularly good application properties are part of the present invention.

In a first embodiment of the inventive procedure, it is necessary for elemental sulfur to be added to the reaction mixture or to one of the reaction components before the start of the reaction in order to suppress almost completely the formation of soluble organic polymeric phosphates as by-products and in order to achieve biosorbents with greater mechanical strength, in particular for use thereof as packing in columns for exchange or extraction processes.

In another embodiment of the inventive procedure, without addition of sulfur, biosorbents are distinguished in particular by good sorption performances. If necessary, it is also possible according to a further embodiment of this procedure to add elemental sulfur to the reaction components or to the reaction mixture before the start of the reaction. The elemental sulfur can be mixed either with the cellulose-containing material or with the phosphorylating agent, phosphoric acid or ammonium phosphate, or with the urea, or be added to the reaction mixture. On use of phosphoric acid, the sulfur can also be dispersed in the phosphoric acid. It is essential that the addition of the elemental sulfur takes place before the required reaction temperature is reached. If the reaction or synthesis mixture is dried before the reaction under vacuum, the elemental sulfur can also be added to the synthesis mixture after completion of the drying process. The amounts of elemental sulfur used depend on the amount of cellulose-containing material used and ought to be from 0.1 to 10%, preferably 0.5 to 2%, based on the amount of cellulose-containing material used.

The form in which the elemental sulfur is added has no importance for the success of the process. The sulfur can be added in ground form, in the form of flakes or by spraying on molten sulfur. It is important that elemental sulfur is present during the reaction of the initial components, cellulose-containing material, urea and phosphoric acid or ammonium phosphate. The gases formed during the reaction contain no hydrogen sulfide or mercaptans. The amount of sulfur used ought not to overload the biosorbent to be produced because release of fine-particle sulfur is to be expected on use of the biosorbents. For this reason, the amount of elemental sulfur used should not be more than 10%, based on the amount of cellulose-containing material used. The lower limit for the amount of sulfur needed to be used depends on the nature of the cellulose-containing material and should, however, not be below 0.1%.

It has surprisingly emerged that the formation of organic polymeric phosphates as by-products is virtually completely suppressed in the production of biosorbents from cellulose-containing material by phosphorylation with phosphoric acid or ammonium phosphate and in the presence of urea and addition of elemental sulfur. The addition of sulfur moreover results in biosorbents with a greater mechanical strength which has very advantageous effects especially on use of the biosorbents as packing in columns for exchange or extraction processes. The relatively smooth surface of the individual sorbent particles results in the packing as such having considerably improved mechanical stability, so that higher flow rates of the liquids to be treated have no adverse effects on the sorbent packing and the sorption performance.

Since organic polymeric phosphates are no longer present in the crude product of the biosorbents, the expenditure on purification and, in particular, the consumption of water can be considerably reduced. The added elemental sulfur has, after completion of the reaction and the purification of the crude product, no disadvantageous effect during subsequent use of the biosorbents on the sorption capacity and the sorption rate. Since the soluble organic polymeric phosphates are no longer present, the sorption characteristics are improved when the solutions to be purified have low metal concentrations because the formation of soluble complex compounds with the phosphates does not occur as reaction competing with the sorption on the solid sorbent.

If it is intended to produce particularly hard sorbent particles, it is advisable to employ a material which is already granular as cellulose-containing reaction component. On use of resinous cellulose material such as, for example, softwood granules, an additional advantage of the addition of elemental sulfur is that the formation of resin soaps is considerably reduced. Almost bubble-free filling of extraction apparatuses containing packings of biosorbents made of these materials and produced according to the invention is achieved. In addition, an additional effect in the production of biosorbents is that no resinous constituents condense with the reaction gases, and thus maintenance of the reaction system is simplified. The sulfur which sublimes to a small extent as by-product can easily be washed off.

In a specific procedure, biosorbents are obtained, without addition of sulfur, which are additionally distinguished by excellent application properties, in particular by very high sorption performances. The biosorbents produced without addition of sulfur are preferably suitable for sorption in stirred containers. Cellulose-rich materials with low resin and lignin contents in particular result in products which are easy to purify even in the absence of sulfur. According to a further embodiment of this procedure, elemental sulfur can also be added to the reaction mixture or to one of the reaction components.

The cellulose-containing starting material is converted into a particularly reactive form before the phosphorylation and carbamidation reaction. This so-called activation takes place by adjusting a moisture content of the cellulose-containing material to a value of from 30 to 60%, in particular by addition of water. The cellulose-containing starting material normally already has a water content of from 5 to 25%. In order to achieve the desired activation, it is necessary to expose the cellulose-containing material to the action of water over a period of at least one hour. The duration depends essentially on the moisture content already present in the material. The reactants phosphorylating agent and urea must be mixed into the cellulose-containing material in such a way that they are uniformly distributed after completion of the mixing process. Besides the activation mentioned, particular attention must be paid to uniform distribution of the reactants in the cellulose-containing material.

It is not absolutely necessary to comply with a particular sequence of addition of the reactants, but separate addition, first of phosphorylating agent and then of urea, ought to be preferred because the mixing process can take place in each case at room temperature, and sorbents with particularly good application properties were obtained on compliance with this sequence.

It is possible, in particular on use of dry cellulose-containing materials with a water content of about 10% or less, for the activation advantageously to be combined with the mixing with urea and/or phosphorylating agent. A clear solution of the amounts to be added of urea and/or phosphorylating agent and of the amount of water intended for the activation is formed, where appropriate by heating these components up to a temperature of 60° C., and is employed in place of water for activating the cellulose-containing material. The cellulose-containing material ought in this case to be heated to the temperature of the solution beforehand. However, care must be taken during the activation time that no loss of water occurs. An essential step in the process is to drive off virtually completely the moisture still present in the reaction mixture before the actual phosphorylation and carbamidation. This takes place by heating the mixture to temperatures of from 60 to 100° C. and simultaneously applying vacuum. Only when the water has been distilled may the subsequent phosphorylation and carbamidation reaction be initiated, which is likewise carried out under vacuum.

Carrying out this reaction under vacuum leads to a number of crucial advantages. The reduction in the reaction temperature necessary in previously disclosed processes by about 40° C. is of great importance. The reaction temperatures can thus be reduced to 125 to 145° C. Accordingly, side reactions of phosphorylating agent and urea are distinctly reduced, and the composition reactions of the cellulose-containing material are suppressed. This makes it possible to reduce the amounts of reactants urea and phosphorylating agent used. In addition, an improvement in the product color, in the stability of the sorbent particles and a considerable reduction in the expenditure on purifying the sorbent particles are achieved.

Since the reaction temperatures are low and the amounts of phosphorylating agent and urea used are small, it is ensured that the cellulose-containing material is treated under mild conditions during the phosphorylation and carbamidation. The structures and mechanical properties of the cellulose-containing materials are substantially retained thereby on conversion into the sorbent. It is thus possible, starting from the particular cellulose-containing starting material, to determine the later purpose of use of them. Thus, for example, sorbent particles based on wood, which are particularly hard and compact, are preferably employed for sorption in columns. On the other hand, flocculent and softer sorbent particles, such as, for example, based on beet pulp or barley straw, are more suitable for batchwise sorption.

For production of the sorbents it is important to comply with reaction times of at least one hour. With shorter reaction times, the phosphorylating agent employed is incompletely reacted and, in particular, the nitrogen content is too low. It has furthermore emerged that the sorption capacity markedly declines after reaction times which are too long, i.e. more than four hours, in which case the known condensation reactions of the phosphate groups with one another to give diphosphates etc. evidently take place.

A comparative test on the production of the sorbents according to the invention without cellulose-containing material resulted in no substances of low solubility in water, so that there is no reason to suppose that urea condensates which are insoluble in water and have sorptive properties adhere through side reactions to the sorbent and falsify the results.

After completion of the reaction time, the reaction product is cooled to normal temperature in a manner known per se, and the impurities are washed out. Any technical quality of phosphoric acid can be employed, in particular the commercially available 85% strength. Suitable urea is preferably in prilled form, but any other technical commercial product is suitable.

Tests have shown that the use of larger amounts of phosphoric acid and thus the attempt to have a higher phosphorus content than stated with addition of an amount of urea which is increased within the proposed ratio leads to poorer sorbents with a nitrogen content which is too low and, furthermore, to deficient stability of the sorbents as a result of excessive swelling. On use of less phosphoric acid, the capacity of the sorbents decreases correspondingly. A disproportionately large increase in the urea employed leads to unchanged products but to additional pollution of the washing water by unreacted urea. A reduction in the urea employed below the stated molar ratio leads to a diminution in the sorption performances despite adequate degrees of phosphorylation or, in the case of drastic reduction, additionally to inadequate utilization of the phosphorylating agent employed, i.e. to lower degrees of phosphorylation.

In accordance with the proposed procedure, use of distinctly smaller amounts of urea and phosphorylating agent leads to sorbents with high sorption performance. This was not to be expected from the information in the known prior art. Compared with the amounts of urea and phosphorylating agent otherwise usually employed, these can be reduced by about one half, resulting in biosorbents with excellent properties. The small amounts used also lead, besides a reduction in costs, to a smaller expenditure for eliminating the waste products from the washing water on purification of the sorbent particles.

Suitable cellulose-containing materials are all natural materials with cellulose as strengthening substance, such as a wide variety of woods, but also sugar beet pulp, straw and sunflower seed shells. For conversion into the sorbents according to the invention, it is important to generate the particle size required for the finished sorbent by appropriate comminution of the cellulose-containing material even before the subsequent activation. The comminution to a particle size of from 0.2 to 4.0 mm is effected, for example, by cutting mills. The various cellulose-containing materials with their diverse fiber structures, densities and strengths extend the areas of use of the sorbents which can be obtained therefrom. The cellulose-containing materials suitable for carrying out the process according to the invention normally have a water content of about 5 to 25%. The moisture content of these materials is adjusted for the activation to from 30 to 60%, for example by adding water. Mixtures of different cellulose-containing materials can also be employed as starting materials. It is also possible to produce by the proposed procedure biosorbents which have a phosphorus content at the level of from 5 to 10% and a nitrogen content at the level of from 1 to 4%, and in which the nitrogen is present in the form of carbamide groups.

These are distinguished by very good sorption properties compared with known biosorbents which are obtained starting from other amounts of phosporylating agent and urea used, and in which the nitrogen is not present in the form of carbamide groups. As a consequence of the functional phosphate groups and carbamide groups present in the biosorbents, they have very high sorption performances, it having been possible to achieve sorption capacities of up to 6 meq/g for various heavy metals, and a high strength of binding of the heavy metals, as proved by the equilibrium data shown in the examples. The cause is supposed to be a synergism by the phosphate ester and carbamide groups formed. An optimum of the biosorbents in relation to the sorption performances was found within the stated ranges of nitrogen and phosphorus content.

For use of these biosorbents in adsorber columns where particularly great demands are made on the mechanical stability of the sorbent packing it is necessary to add elemental sulfur to the synthesis mixture before the start of the reaction. The invention also comprises biosorbents for which no particularly great demands are made for sorption performance but which are intended to have high mechanical stability. These sorbents, in which the nitrogen is not present in the form of carbamide groups, are obtained by adding elemental sulfur to the synthesis mixture before the start of the reaction.

DETAILED DESCRIPTION OF PREFERRED EMBODIMENTS

EXAMPLES

A Production of the Biosorbents as Crude Product

Example 1

100 g of poplar wood sawdust in a sieve fraction from 0.5 to 2 mm and with a water content of 11% are mixed with 5 g of elemental sulfur in powder form and introduced into a solution of 446 g of urea in 848 ml of phosphoric acid (85% strength) and 100 ml of water and mixed. The resulting thin paste is distributed on porcelain dishes so that a layer about 1 cm thick is present. The porcelain dishes with the applied reaction mixture are dried in a ventilated drying oven at a temperature of 80° C. for 1 hour. The reaction mixture is then remixed, and the porcelain dishes are covered with stainless steel plates and treated further in the drying oven, feeding a gentle stream of nitrogen into the drying oven. Over the course of one hour, the temperature in the drying oven is raised to the reaction temperature of 165° C. and is maintained for a period of 1.5 hours. After this period, the reaction is complete and the resulting biosorbent crude product is cooled.

Example 2

100 g of chopped rye straw in a sieve fraction from 2 to 5 mm and with a water content of 12% are introduced with a solution at 90° C. of 94.1 g of ammonium dihydrogen phosphate and 135 g of urea in 75 ml of water and mixed. The mixture is stored in a closed container for 2 hours and then put in a 2 l flask which is connected to a laboratory rotatory evaporator. The mixture is stirred at a temperature of 90° C. with an applied vacuum of 4.00 kPa until water no longer distills out. Then 18 g of sulfur powder are added and vigorously mixed with the reaction mixture. Subsequently, the temperature is raised to 145° C., maintaining the vacuum and stirring further. The reaction temperature is maintained for a period of 2.5 hours. After the initial vigorous evolution of gas has subsided, after a reaction time of 2.5 hours, the reaction is complete. The resulting biosorbent crude product is cooled.

Example 3

100 g of powdered spruce wood with a particle size of from 0.4 to 1.25 mm and a water content of 11% is mixed with an amount of 1 g of elemental sulfur in powder form and, at room temperature in a closeable container, 50 ml of water are poured over and mixed. The container is then kept closed for two hours. After completion of the activation, the water content of the powdered spruce wood is 41%. Then 50.2 ml of 85% strength phosphoric acid (8.26 mol/kg of wood) are slowly added dropwise to the activated powdered spruce wood, and mixed with the powdered wood for a period of 30 min. After this mixing process, 148.2 g of prilled urea (3.35 mol/mol of phosphoric acid) are added to the mixture and mixing is continued for 30 min. The moist, free-flowing mixture is then put into a laboratory rotatory evaporator (2 l flask), a vacuum of 4.00 kPa is applied, and the temperature is raised to 90° C. by means of an oil bath while stirring continuously until water no longer distills out. While maintaining the applied vacuum and continuing stirring, the anhydrous mixture is heated to a reaction temperature of 135° C., and this temperature is maintained during the mixing process. The initial evolution of gas subsided after 1½ hours, and the reaction process was terminated. The crude product was then cooled.

Examples 4 to 13

The process was carried out in analogy to Example 3 starting from various cellulose-containing materials but altering the starting components and the process parameters as follows.

| | a) Starting components | | | | | |
|---|---|---|---|---|---|---|
| | Cellulose- | | | $H_3PO_4(85\%)$ | | |
| Ex. | containing starting material | Water content (%) | (ml) | Number of moles[1] | Urea (g | Molar ratio[2] |
| 3 | F3 | 11 | 50.2 | 8.26 | 148.2 | 3.35 |
| 4 | F1 | 28 | 58.5 | 11.9 | 154.2 | 3.0 |
| 5 | F2 | 28 | 25.0 | 5.1 | 99.1 | 4.5 |
| 6 | F3 | 11 | 51.6 | 8.5 | 149.8 | 3.3 |
| 7 | F3 | 11 | 50.2 | 8.26 | 110.3 | 2.0 |
| 8 | F3 | 11 | 50.2 | 8.26 | 132.3 | 3.0 |
| 9 | F3 | 11 | 50.2 | 8.26 | 176.4 | 4.0 |
| 10 | P3 | 22 | 63.9 | 12.0 | 196.6 | 3.5 |
| 11 | B4 | 10 | 55.3 | 9.0 | 194.4 | 4.0 |
| 12 | R5 | 12 | 36.0 | 6.0 | 110.9 | 3.5 |
| 13 | G2 | 14 | 35.2 | 6.0 | 77.4 | 2.0 |

Cellulose-containing starting material:
F = Spruce wood
P = Poplar wood
B = Beech wood
R = Beet pulp
G = Barley straw
Particle size in mm:
1 = 1.0–2.0
2 = 0.2–1.0
3 = 0.4–1.25
4 = 0.2–0.8
5 = 0.2–2.0
[1]Mol of $H_3PO_4$ per kg of cellulose-containing material
[2]Mol of urea per mol of $H_3PO_4$

| | b) Process Parameters | | | | | | | |
|---|---|---|---|---|---|---|---|---|
| | | Activation | | | Drying | | Reaction | | |
| | Added | | Water | | | | | |
| Example | $H_2O$ (ml) | Time (h) | content (%) | Temp. (° C.) | Vacuum (kPa) | Temp. (° C.) | Vacuum (kPa) | Time (h) |
| 3 | 50.0 | 2 | 41 | 90 | 4.00 | 135 | 4.00 | 1.5 |
| 4 | 75.6 | 1 | 59 | 70 | 6.67 | 125 | 6.67 | 1.0 |

-continued b) Process Parameters

| Example | Activation | | Water content (%) | Drying | | Reaction | | |
|---|---|---|---|---|---|---|---|---|
| | Added $H_2O$ (ml) | Time (h) | | Temp. (° C.) | Vacuum (kPa) | Temp. (° C.) | Vacuum (kPa) | Time (h) |
| 5 | 5.9 | 3 | 32 | 80 | 26.66 | 140 | 26.66 | 4.0 |
| 6 | 74.5 | 2 | 49 | 90 | 13.33 | 140 | 13.33 | 2.1 |
| 7 | 50.9 | 2 | 41 | 70 | 5.33 | 130 | 5.33 | 1.1 |
| 8 | 50.9 | 2 | 41 | 80 | 3.33 | 130 | 3.33 | 1.9 |
| 9 | 50.9 | 2 | 41 | 90 | 20.00 | 140 | 20.00 | 3.3 |
| 10 | 32.2 | 3 | 41 | 90 | 4.00 | 125 | 4.00 | 4.0 |
| 11 | 38.5 | 3 | 35 | 90 | 4.67 | 125 | 4.67 | 3.1 |
| 12 | 120.0 | 1 | 60 | 80 | 9.33 | 135 | 9.33 | 2.6 |
| 13 | 24.6 | 1 | 31 | 90 | 14.66 | 140 | 14.66 | 1.1 |

COMPARATIVE EXAMPLES

Comparative Example 1

A biosorbent crude product is produced in analogy to Example 1 but without addition of sulfur.

Comparative Example 2

A biosorbent crude product is produced in analogy to Example 2 but without addition of sulfur.

Comparative Example 3

A biosorbent crude product is produced in analogy to Example 3 but without addition of sulfur.

Comparative Example 4

The process is carried out in analogy to Example 3 but without addition of sulfur and with an alteration in the added amounts of phosphoric acid and urea. Compared with Example 3, 2.5 times the amount of phosphoric acid, 125 ml (equivalent to 20.65 mol of $H_3PO_4$ per kg of spruce wood dry matter) and 2.5 times the amount of urea, 370.5 g (equivalent to 8.375 mol/mol of $H_3PO_4$) were added.

Comparative Example 5

The process was carried out in analogy to Example 5 but with an alteration in the added amount of phosphoric acid. This was 19.6 ml (equivalent to 4.0 mol of $H_3PO_4$ per kg of spruce wood dry matter).

Comparative Example 6

The process was carried out in analogy to Example 7 but with a change in the added amount of urea. This was 66.2 g, which is equivalent to a molar ratio of urea to phosphoric acid of 1.5:1.

B Purification of the Crude Product

The biosorbent crude products produced in Examples 1 to 3 and Comparative Examples 1 to 3 are treated to extract the by-products as follows.

The cooled crude products are stirred with 1 l of water and put, free of bubbles, into a glass column usual for column chromatography or ion exchange processes, which is filled with water and has a diameter of 8 cm and a height of 20 cm. A flat perforated plate is attached above the bottom outlet. The level of liquid in the column is controlled by adjusting the height of the overflow connected to the bottom outlet. The sorbent packing in the column is 12 cm high. The crude product is purified by introducing a constant stream of 150 ml/h of water. At defined intervals, samples of the purifying water are taken at the overflow and investigated to detect phosphates. Detection takes place by the method which is customary per se, using ammonium molybdate and nitric acid at the boiling point. The phosphate detection led to the following results for the various biosorbents:

| | Sample taken after an extraction time of (in hours) | Consumption of purifying water (in liters) | Phosphate detection |
|---|---|---|---|
| Example | | | |
| 1 | 8 | 1.2 | Yellow color |
| | 10 | 1.5 | Negative |
| 2 | 10 | 1.5 | Pale yellow color |
| | 12 | 1.8 | Negative |
| 3 | 10 | 1.5 | Negative |
| Comparative Example | | | |
| 1 | 10 | 1.5 | Yellow precipitate |
| | 20 | 3.0 | Yellow turbidity |
| | 30 | 4.5 | Slight yellow color |
| 2 | 30 | 4.5 | Yellow color |
| | 40 | 6.0 | Pale yellow color |
| 3 | 10 | 1.5 | Yellow precipitate |
| | 20 | 3.0 | Yellow turbidity |
| | 30 | 4.5 | Yellow turbidity |
| | 40 | 6.0 | Yellow color |
| | 50 | 7.5 | Pale yellow color |

"Negative" means that phosphate is no longer detectable.

As proved unambiguously by the results for Comparative Example 3, the biosorbent still has a considerable phosphate load after a purifying time of 50 hours, which is manifested by yellow color still being present in the phosphate detection in the purifying water. For comparative investigations, "purified" biosorbent particles according to Comparative Example 3 are taken out of the column and stirred with 300 ml of water and 100 ml of 1N NaOH in a container. The biosorbent particles are then again packed into the glass column to continue the extraction process, and the purification is continued in the manner described at the outset by adding a further 5 l of water, and corresponding samples of the purifying water were taken and the phosphate detection was carried out. The following results were obtained thereby:

| Sample taken after an extraction time of (in hours) | Consumption of purifying water (in liters) | Phosphate detection |
|---|---|---|
| 10 | 1.5 | Yellow color |
| 20 | 3.0 | Pale yellow color |
| 30 | 4.5 | Pale yellow color |

These results show that complete removal of the soluble organic polymeric phosphates could not be achieved even by treating the biosorbents with sodium hydroxide solution.

Since no standardized test method for testing the mechanical stability of biosorbents yet exists, and what matters in practice is, in the final analysis, the mechanical strength of the sorbent packing, the following test method which is customary per se is carried out.

After completion of the purification stages, the water is discharged from the glass columns packed with the biosorbents, and the sorbent packing is sucked free of drops by applying a vacuum of 33.33 kPa for a period of 30 min. The height of the sorbent packing is then measured and the sorbent packing is examined for fissuring.

The results obtained in this way represent reliable information about the mechanical stability of the sorbent packing and the mechanical strength of the sorbent particles. The results obtained are as follows:

| | Height of the sorbent packing in the column (in cm) | | |
|---|---|---|---|
| | Before the vacuum treatment | After the vacuum treatment | Fissuring of the sorbent packing after the vacuum treatment |
| Example | | | |
| 1 | 12 | 11 | none |
| 2 | 14 | 12 | none |
| 3 | 12 | 11 | none |
| Comparative Example | | | |
| 1 | 17 | 13 | Slight fissuring |
| 2 | 18 | 12 | Slight fissuring |
| 3 | 16 | 11 | Distinct fissuring |

As proved by the Comparative Examples, the addition of elemental sulfur suppresses the formation of soluble organic polymeric phosphates in the biosorbents, and the produced biosorbents show distinctly improved mechanical strength by comparison with the biosorbents obtained without added sulfur.

The biosorbents produced in Examples 3 to 13 and Comparative Examples 4 to 6 were obtained in the following yield and dry content with respective P and N contents:

| | C Properties of the final products | | | |
|---|---|---|---|---|
| | Yield | Dry content | Content | |
| | (g) | (%) | P (%) | N (%) |
| Example | | | | |
| 3 | 423.6 | 33.4 | 7.7 | 1.3 |
| 4 | 327.0 | 38.2 | 10.0 | 1.0 |
| 5 | 363.6 | 29.7 | 6.0 | 4.0 |
| 6 | 435.5 | 32.1 | 7.8 | 2.1 |
| 7 | 416.8 | 34.0 | 7.9 | 1.1 |
| 8 | 420.8 | 31.3 | 5.0 | 1.9 |
| 9 | 359.0 | 40.2 | 9.1 | 3.3 |
| 10 | 341.9 | 38.7 | 9.9 | 4.0 |
| 11 | 351.8 | 41.3 | 8.2 | 3.1 |
| 12 | 671.1 | 9.7 | 6.8 | 2.6 |
| 13 | 548.0 | 12.7 | 5.0 | 1.1 |
| Comparative Example | | | | |
| 4 | 401.7 | 40.4 | 14.2 | 0.1 |
| 5 | 363.5 | 28.8 | 4.1 | 4.2 |
| 6 | 389.4 | 35.5 | 7.0 | 0.4 |

The biosorbents produced in Examples 3 to 13 and Comparative Examples 4 to 6 were investigated for their sorption properties as follows. Determination of the sorption equilibrium data took place by the following method:

250 ml graduated flasks were charged with the moist sorbent samples (0.1 to 0.025 g dry matter) and in each case 1 to 5 ml of M/10 solutions of salts of the metals Cu, Cd or Pb, made up to the mark, provided with a magnetic stirrer bar and stirred at room temperature for 3 hours. After settling, the solutions were decanted off, and their pH was determined and their metal content was found by complexometry. The equilibrium concentrations of the sorbent were calculated from the equilibrium concentrations in the solution obtained in this way and from the initial concentrations fixed by the addition of metal salt solutions. Addition of appropriate amounts of nitric acid before making up the graduated flask to the mark adjusted to pH=3 for the sorption. Several control measurements of the equilibrium concentrations in the solution via atomic absorption spectroscopy (AAS) revealed deviations within the range of accuracy of the measurement and thus confirmed the reliability of complexometric analyses for the sorption investigations.

The sorption capacities found for the individual sorbents are indicated in the following table.

The strength of the sorption was determined on the basis of the equilibrium data at low equilibrium concentrations (below 10 mg/l) in the solution (likewise at room temperature and pH 3). The metal-specific equilibrium coefficient $K_{Me}$, which is per se, was calculated by the formula $$K_{Me} = C_S/C_1$$

to improve the clarity of the data.

In this, $C_S$ is the equilibrium metal concentration in the sorbent in mg/g and $C_1$ is the equilibrium concentration of metal in the in mg/l.

The calculated results are likewise indicated in the following table.

| Example | Capacity (meq/g) | Strength as $K_{ME}$ (l/g) | | |
|---|---|---|---|---|
| | | $K_{Cu}$ | $K_{Cd}$ | $K_{Pb}$ |
| 3  | 5.3 | 38.6 | 126.2 | 62.6 |
| 4  | 5.6 | 32.1 | 90.6  | 40.9 |
| 5  | 4.7 | 41.8 | 133.7 | 69.8 |
| 6  | 5.1 | 40.1 | 120.4 | 63.3 |
| 7  | 4.9 | 35.3 | 122.8 | 61.9 |
| 8  | 5.0 | 31.2 | 118.1 | 58.4 |
| 9  | 5.1 | 45.1 | 139.3 | 71.3 |
| 10 | 5.5 | 43.0 | 140.9 | 59.6 |
| 11 | 5.1 | 37.5 | 125.4 | 65.2 |
| 12 | 4.5 | 20.7 | 80.9  | 39.2 |
| 13 | 4.6 | 18.9 | 76.0  | 39.1 |
| C4 | 5.1 | 2.5  | 6.2   | 10.3 |
| C5 | 3.6 | 11.2 | 24.6  | 19.9 |
| C6 | 3.9 | 5.2  | 25.7  | 19.3 |

The sorption results show that it was possible to achieve an ion exchange capacity of 4.5 to 5.6 meq/g on use of about 50% less phosphoric acid and urea compared with the amounts customarily used to date. The lower values were found for sorbents based on beet pulp and barley straw, which show lower capacities based on their material structure.

Concerning the calculated equilibrium coefficients $K_{ME}$ for the metals Cu, Cd or Pb, very good results were achieved according to the examples according to the invention, which are considerably better than the strength values for known sorbents. The Comparative Examples prove that on use of amounts of the reactants phosphoric acid and urea which are outside those according to the invention, considerably poorer sorption properties are achieved, in particular in relation to the strength.

What is claimed is:

1. Process for producing biosorbents consisting of phosphorylating cellulose-containing materials with phosphoric acid or ammonium phosphate in the presence of urea, where a reaction mixture containing said cellulose-containing materials, phosphoric acid or ammonium phosphate, and urea is heated to a reaction temperature and, after completion of a reaction time, cooled to room temperature, and impurities are washed out; with the addition of elemental sulfur to the reaction mixture or to a reaction component before the start of the reaction.

2. Process according to claim 1, consisting of
adding the elemental sulfur in amounts of from 0.1% to 10% by weight, based on an amount of cellulose-containing material used.

3. Process according to claim 1, consisting of
adding the elemental sulfur in amounts of from 0.5% to 2% by weight, based on an amount of cellulose containing material used.

4. Process according to claim 1, consisting of
adding the elemental sulfur before the reaction mixture reaches a temperature of 110° C.

5. Process for producing biosorbents, by phosphorylating cellulose-containing materials with phosphoric acid or ammonium phosphate in the presence of urea, where a reaction mixture containing said cellulose-containing materials, phosphoric acid or ammonium phosphate, and urea is heated to a reaction temperature and, after completion of a reaction time, cooled to room temperature, and impurities are washed out, consisting of carrying out the phosphorylation by the following process steps:
a) activating the cellulose-containing material by adjusting said material to a moisture content of from 30% to 60%, and maintaining this for a period of at least one hour;
b) adding the phosphorylating agent in an amount of from 6 to 12 mol per kg of anhydrous cellulose-containing material;
c) adding of urea in a molar ratio to the phosphorylating agent of from 2.5:1 to 4.5:1;
d) mixing components urea and phosphorylating agent with activated cellulose-containing material until the components are uniformly distributed in the reaction mixture;
e) evaporating moisture present in the reaction mixture formed in process steps a) to d) by heating the mixture to a temperature of from 60 to 100° C. while simultaneously applying a vacuum;
f) carrying out a phosphorylating and carbamidation by heating the mixture to a temperature of from 125 to 145° C. while simultaneously applying a vacuum during a reaction time of from one to four hours; and
g) cooling a reaction product to room temperature and washing out impurities.

6. Process according to claim 5, consisting of
adding elemental sulfur to the reaction mixture or to a reaction component before start of the reaction.

7. Process according to claim 6, consisting of
adding elemental sulfur in amounts of from 0.1% to 10%, by weight, based on the amount of cellulose-containing material used.

8. Process according to claim 6, consisting of
adding elemental sulfur in amounts of from 0.5% to 2% by weight, based on the amount of cellulose-containing material used.

9. Process according to claim 6, consisting of
adding elemental sulfur before the reaction mixture reaches a temperature of 110° C.

10. Process according to claim 5, consisting of
adding a predetermined amount of water to the cellulose-containing material for the activation.

11. Process according to claim 5, consisting of
first adding the phosphorylating agent to the activated cellulose-containing material and uniformly distributing the agent, and
then adding the urea.

12. Process according to claim 5,
consisting of a mixing time for mixing the phosphorylating agent and the urea which is at least 15 min.

13. Process according to claim 5, consisting of
mixing reaction components phosphorylating agent and urea with the cellulose-containing material at room temperature.

14. Process according to claim 5, consisting of
mixing the phosphorylating agent and the urea with the amount of water intended for activation to produce a solution;
and the solution obtained in this way is mixed with the cellulose-containing material for the activation.

15. Process according to claim 14, consisting of
carrying out the mixing of the phosphorylating agent and urea with the water while heating to temperatures of up to 60° C.

16. Process according to claim 14, consisting of
heating the cellulose-containing material, before the activation, to the temperature of the solution of urea and phosphorylating agent in water.

17. Process according to claim 5, consisting of
applying a vacuum at a value of from 6.67 kPa to 26.66 kPa.

18. Process according to claim 5, consisting of
comminuting the cellulose-containing material to a particle size of from 0.2 to 4.0 mm before the activation.

19. Biosorbents for removing heavy metals from aqueous solutions, consisting of
cellulose-containing materials phosphorylated with phosphoric acid or ammonium phosphate and urea, having a phosphorus content of from 5% to 10% by weight and nitrogen content of from 1% to 4% by weight; and the nitrogen is present in the form of carbamide groups.

20. Biosorbents for removing heavy metals from aqueous solutions, consisting of
cellulose-containing materials phosphorylated with phosphoric acid or ammonium phosphate and urea, having a phosphorus content from 5% to 10% by weight and a nitrogen content of from 1% to 4% by weight, and the nitrogen is present in the form of carbamide groups; with elemental sulfur present in the synthesis mixture before the start of the reaction.

* * * * *